Jan. 31, 1967   JAMES E. WEBB   3,300,981
ADMINISTRATOR OF THE NATIONAL AERONAUTICS
AND SPACE ADMINISTRATION
ZERO GRAVITY STARTING MEANS FOR LIQUID PROPELLANT MOTORS
Filed Jan. 7, 1965   2 Sheets-Sheet 1

INVENTOR.
RICHARD N. PORTER
BY
ATTORNEY

Jan. 31, 1967

JAMES E. WEBB
ADMINISTRATOR OF THE NATIONAL AERONAUTICS
AND SPACE ADMINISTRATION
ZERO GRAVITY STARTING MEANS FOR LIQUID PROPELLANT MOTORS

Filed Jan. 7, 1965

INVENTOR.
RICHARD N. PORTER
BY
John McCoy
ATTORNEY

3,300,981
ZERO GRAVITY STARTING MEANS FOR LIQUID PROPELLANT MOTORS

James E. Webb, Administrator of the National Aeronautics and Space Administration with respect to an invention of Richard N. Porter
Filed Jan. 7, 1965, Ser. No. 424,157
9 Claims. (Cl. 60—259)

This invention relates to zero gravity starting means for liquid propellant rocket motors. When liquid propellant rocket motors are subjected to inertial or gravitational forces, they may be readily started and restarted by introducing a pressurizing gas into the top of a propellant tank to force the liquid propellant from the bottom of the tank. A definite planar interface is maintained between the pressurizing gas and the liqiud propellant so that the liquid propellant remains bubble free.

It is important for the presence of bubbles will cause the rocket motor to operate roughly or even explode.

When the rocket motor is in space and under a condition of zero gravity and a pressuring gas is injected into the propellant tank, the planar interface disappears. Instead, the liquid and gaseous phase intermingle. Random circulation forces and surface tension forces prevail so that the pressurizing gas forms bubbles which migrate randomly throughout the liquid propellant. However, if a gravity or inertial force condition is restored, the planar interface quickly reforms producing bubble free liquid propellant at the bottom or discharge end of the tank, due to the greater inertia of the liquid propellant.

The primary object of this invention is to provide means whereby a small auxiliary body of liquid propellant is contained within a collapsible container disposed in the propellant tank so that the auxiliary body of liquid propellant is subjected to the force exerted by the propellant pressuring gas but is isolated therefrom, and means is provided to utilize the auxiliary body of propellant during the initial period of rocket motor operation so as to re-establish a gravity or inertial force field.

A further object is to provide a means whereby as the auxiliary body of propellant is depleted, the main body of the propellant becomes available so that operation of the rocket motor is without interruption.

A further object is to provide a starting system wherein the collapsible container is refilled during operation of the rocket motor and, after stopping the rocket motor, is maintained in a refilled condition for a subsequent restarting of the rocket motor, so that the rocket motor may be repeatedly started under a gravity free condition.

With the above and other objects in view as may appear hereinafter, reference is directed to the accompanying drawings, in which.

A typical liquid propellant rocket motor assembly includes a rocket motor 1 connected by supply lines 2 and 3 to tandemly disposed liquid propellant tanks 4 and 5. The ends of the propellant tanks opposite from the supply lines are connected to pressurizing lines 6 which in turn are connected to a source of pressurizing gas 7. The supply lines 2 and 3 are provided with suitable control valves 8.

Figure 1:
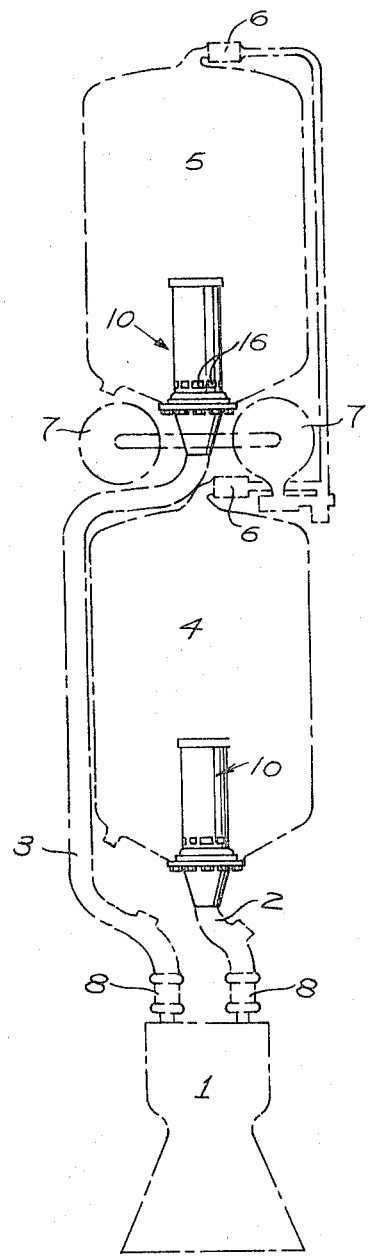
FIGURE 1 is a substantially diagrammatical view in which is indicated by broken lines, a rocket motor, a pair of propellant tanks, valve controlled supply lines communicating between the propellant tanks and the rocket motor, and means for pressurizing the propellant tanks and showing by solid lines, a pair of starting means interposed between the propellant tanks and the supply lines.

If the rocket motor is subjected to gravitational force in the direction of the thrust of the rocket motor, that is, in a downward direction as viewed in FIGURE 1, the liquid propellant components in the two tanks may be pressurized repeatedly to activate the rocket motor as desired. However, as outlined hereinbefore, if the rocket motor and its tanks are in a gravity free environment, then the pressurizing gas mixes randomly with the attendant possible malfunction of the rocket motor.

Interposed between each propellant tank and its supply line is a starting means 10 which includes a tubular fitting 11 having a longitudinal bore 12. One axial end of the fitting is provided with a flange 13 secured to the margins of the discharge openings in the propellant tanks 4 or 5 as the case may be. Also secured within the discharge opening of the propellant tank is a valve body 14 having a bore 15 continuing a coaxial relation with the bore 12. Intermediate its ends the bore 15 is intersected by a ring of radial ports 16. Reciprocably mounted within the bore 15 is a tubular valve armature 17 having a venturi bore 18. Seal rings 19 are disposed at axially opposite sides of the ports 16 for engagement with the valve armature. It is not necessary that the seal rings be fully operative, that is, some leakage is permissible. As a result, the seal rings may be such as to offer minimum resistance to axial movement of the valve armature. The upper end of the valve armature is enlarged so that the valve armature 17, valve body 14 and fitting 11 define an annular chamber 20 having a movable wall formed by the valve armature.

Radial ports 21 communicate between the throat of the venturi bore 18 and the annular chamber 20. A spring 22 normally holds the valve armature 17 in its upper position. Secured to the upper open end of the valve body 14 is a bellows 23 closed by a top plate 24 so as to form a collapsible container. The bellows is surrounded by a sleeve 25 also extending upwardly from the valve body 14. The upper end of the sleeve 25 is open but is provided with a stop ring 26 to limit expansion of the bellows 23. The bellows is constructed so that it normally occupies an extended position limited by the stop ring 26. Alternatively, the bellows may be surrounded by a spring or provided with an internal spring extending between the valve body 14 and the top plate 24 so as to urge the bellows towards its extended position.

The upper end of the valve armature 17 is provided with a set of radiating webs 27 which supports an axially positioned push rod 28 of such length as to be engaged by the top plate 24 as the bellows or collapsible container approaches its collapsed position.

Operation of the zero gravity starting means is as follows:

When the propellant tanks are initially filled with liquid propellant, the collapsible container formed by the bellows 23 is also completely filled with liquid propellant. Initially, the collapsible container is in communication with the supply line through the throat or bore 18 of the valve armature and the valve armature seals the propellant tank from the supply line. When pressurized gas is applied to the upper end of the propellant tanks as shown in FIGURE 1 and the control valves 8 are opened, the pressurizing gas acts through the liquid propellant to urge the collapsible containers to their collapsed position driving initial charges of liquid propellant components to the rocket motor.

Figure 4:
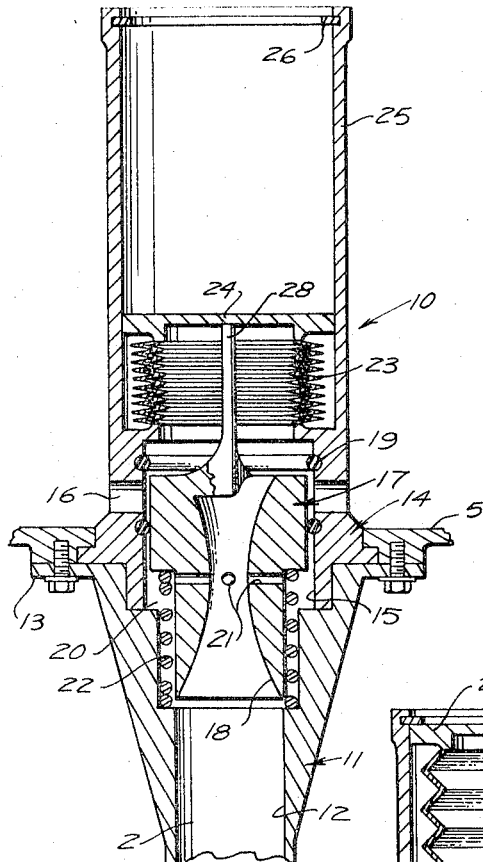
FIGURE 4 is a longitudinal sectional view similar to FIGURE 2 showing the collapsible container as it approaches its collapsed position and showing initial communication with the propellant tank.

As the collapsible container of each starting means approaches its collapsed position, as shown in FIGURE 4, the push rod 28 is engaged forcing the valve armature 17 downward so as to open communication between each propellant tank and its supply line. When the valve armature 17 has completed its downward movement, full communication is established between each propellant tank and its supply line as shown in FIGURE 5.

By reason of flow through the venturi bore 18 of the valve armature, a negative pressure is created in the annular chambers 20. This negative pressure acts in opposition to the spring 22. Once the valve armature is in its lower position as shown in FIGURE 5, the pressure differential across the ends of the valve armature as well as the negative pressure in the annular chamber 20 serves to maintain the valve armature in its lower position. This permits liquid propellant to be drawn upwardly into the collapsible container as the bellows 23 returns to its initial position shown in FIGURE 6.

Figure 5:
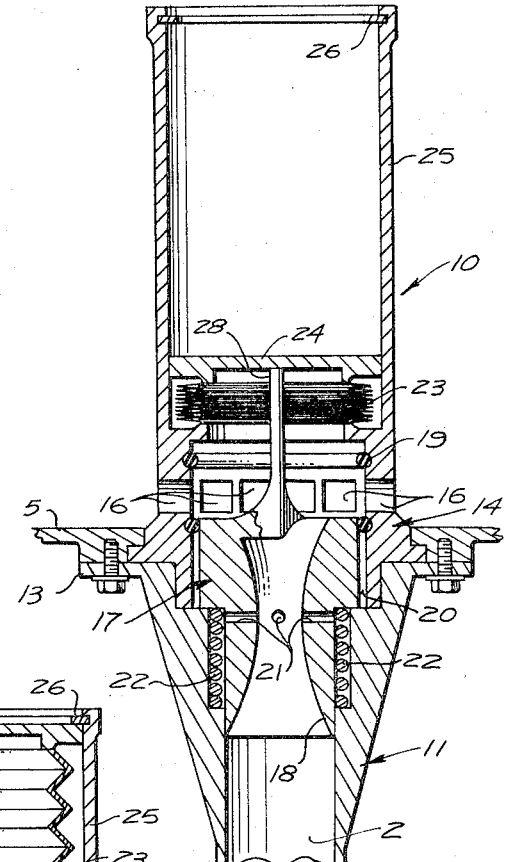
FIGURE 5 is a similar longitudinal sectional view showing the collapsible container in the fully collapsed condition and with full communication established between the propellant tank and the supply line.
Figure 6:
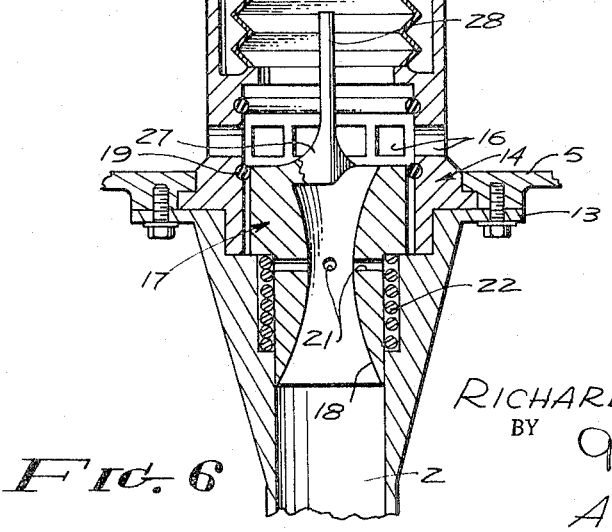
FIGURE 6 is a similar longitudinal sectional view showing the propellant tank in communication with the supply line and showing the collapsible container restored to its extended position.

It should be noted that as the valve armature approaches the lower end of its travel, its lower extremity enters the bore 12, as shown in FIGS. 5 and 6, in order to render the venturi bore 18 effective. That is, when the valve armature is in its upper and intermediate positions as shown in FIGS. 2 and 4, fluid short circuits upwardly around the spring so no vacuum is created in the annular chamber 20 surrounding the valve armature until needed to hold the valve armature in its lower position during flow from the tank 4 or 5.

Figure 2:
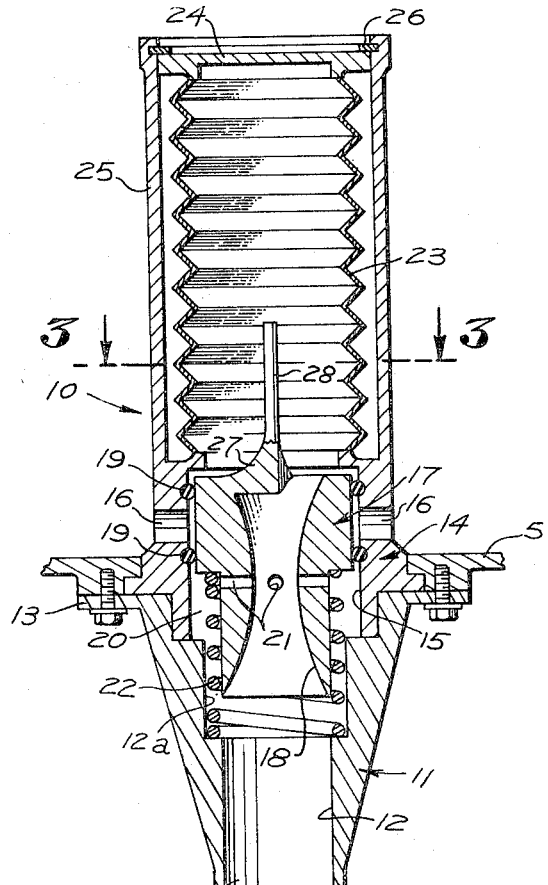
FIGURE 2 is an enlarged longitudinal sectional view of one of the starting means with adjacent portions of the propellant tank and supply line shown fragmentarily, the starting means being shown in its initial position wherein a collapsible container is in communication with the supply line and the propellant tank is isolated therefrom.
Figure 3:
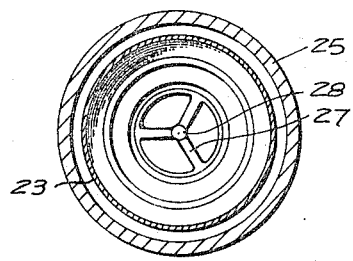
FIGURE 3 is a transverse sectional view through 3—3 of FIGURE 2.

When the control valves 8 are closed, vacuum pressure in the annular chambers 20 is relieved, permitting the springs 22 to return the valve armatures to their initial condition shown in FIGURE 2, isolating the propellant tanks from their supply lines.

On restarting the rocket motor, the collapsible containers in the two starting means again supply an initial charge of liquid propellant to the rocket motor. The collapsible container is so dimensioned that by the time its charge of liquid propellant is depleted, the rocket driven by the rocket motor has gained sufficient velocity to establish a gravity field condition and a coherent interface is established between the liquid propellant and the pressurizing gas even though initially the rocket was in a gravity free environment. It will be noted that by reason of the starting means it is immaterial whether the rocket motor be subjected to gravitational force or be free of gravitational force.

It should be noted that by reason of the fact that the initiating propellants contained in the bellows prior to initial operation of the rocket motor are isolated from the propellants in the tanks 4 and 5, the initiating propellants may be different from the propellants contained in the tanks. For example, the initiating propellants may be capable of spontaneous combustion when mixed and thus form an igniting means for the main propellant.

It should also be noted that the principal purpose of the rings 19 is to prevent gas bubbles from entering the bellows so that their contacting pressure may be minimal to permit free movement of the valve armature.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:

1. The combination with a rocket motor and liquid propellant tank interconnected by a valve controlled supply line and means for introducing a pressurizing gas into said tank, of a starting means interposed between said tank and said supply line, said starting means comprising:
   (a) a collapsible container for a predetermined volume of liquid propellant mounted within said tank, exposed externally to pressures within said tank and communicating with said supply line;
   (b) valve means movable, in response to predetermined movement of a wall of said collapsible container, between a closed position isolating said tank from said supply line and an open position establishing communication therebetween;
   (c) and means operable on discharge of a predetermined quantity of liquid propellant from said collapsible container to open said valve means for continued flow of liquid propellant from said tank.

2. The combination with a rocket motor and liquid propellant tank interconnected by a valve controlled supply line and means for introducing a pressurizing gas into said tank, of a starting means interposed between said tank and said supply line, said starting means comprising:
   (a) a collapsible container for a predetermined volume of liquid propellant mounted within said tank, exposed externally to pressures within said tank and communicating with said supply line;
   (b) valve means movable, in response to predetermined movement of a wall of said collapsible container, between a closed position isolating said tank from said supply line and an open position establishing communication therebetween;
   (c) means operable on discharge of a predetermined quantity of liquid propellant from said collapsible container to open said valve means for continued flow of liquid propellant from said tank;
   (d) and means for refilling said collapsible container during flow of liquid propellant from said tank.

3. The combination with a rocket motor and liquid propellant tank interconnected by a valve controlled supply line and means for introducing a pressurizing gas into said tank, of a starting means interposed between said tank and said supply line, said starting means comprising:
   (a) a tubular valve body interposed between said tank and supply line and having an outlet port connected with said supply line, side ports communicating with said tank, and an open end opposite from said outlet port directed into said tank;
   (b) a collapsible container for liquid propellant continuing from said open end and isolating said open end from the interior of said tank, said container being externally exposed to pressures within said tank, and tending to collapse in response to said pressures;
   (c) a tubular valve armature reciprocable in said valve body between a closed position isolating said side ports and tank from said outlet port and supply line and an open position connecting said tank and supply line, said tubular valve armature affording continuous communication between said collapsible container and said supply line for flow of liquid propellant therefrom as said container collapses in response to pressures in said tank;

(d) and means for maintaining said valve armature in its closed position when said container is extended and for opening said valve armatures as said container approaches its collapsed condition thereby to permit flow of propellant from said tank as the propellant in said container is depleted.

4. The combination with a rocket motor and liquid propellant tank interconnected by a valve controlled supply line and means for introducing a pressurizing gas into said tank, of a starting means interposed between said tank and said supply line, said starting means comprising:
(a) a tubular valve body interposed between said tank and supply line and having an outlet port connected with said supply line, side ports communicating with said tank, and an open end opposite from said outlet port directed into said tank;
(b) a collapsible container for liquid propellant continuing from said open end and isolating said open end from the interior of said tank, said container being externally exposed to pressures within said tank, and tending to collapse in response to said pressures;
(c) a tubular valve armature reciprocable in said valve body between a closed position isolating said side ports and tank from said outlet port and supply line and an open position connecting said tank and supply line, said tubular valve armature affording continuous communication between said collapsible container and said supply line for flow of liquid propellant therefrom as said container collapses in response to pressures in said tank;
(d) and means for maintaining said valve armature in its closed position when said container is extended and for opening said valve armatures as said container approaches its collapsed condition thereby to permit flow of propellant from said tank as the propellant in said container is depleted;
(e) said container tending, on equalization of pressures internally and externally thereto, to expand towards its extended position thereby to draw a charge of liquid propellant therein from said valve during flow of propellant from said tank.

5. The combination with a rocket motor and liquid propellant tank interconnected by a valve controlled supply line and means for introducing a pressurizing gas into said tank, of a starting means interposed between said tank and said supply line, said starting means comprising:
(a) a collapsible container for liquid propellant mounted within said tank, communicating with said supply line and exposed externally to pressures within said tank, whereby, on pressurizing said tank and opening said supply line valve, liquid propellant discharges from said container causing collapse thereof;
(b) and a valve interposed between said tank and supply line having, initially, a closed position restraining discharge of liquid propellant from said tank;
(c) said valve being engageable by a wall of said container as said container approaches its collapsed condition to open said valve initiating flow of liquid propellant from said tank.

6. The combination with a rocket motor and liquid propellant tank interconnected by a valve controlled supply line and means for introducing a pressurizing gas into said tank, of a starting means interposed between said tank and said supply line, said starting means comprising:
(a) a collapsible container for liquid propellant mounted within said tank, communicating with said supply line and exposed externally to pressures within said tank, whereby, on pressurizing said tank and opening said supply line valve, liquid propellant discharges from said container causing collapse thereof;
(b) a valve interposed between said tank and supply line having, initially, a closed position restraining discharge of liquid propellant from said tank;
(c) said valve being engageable by a wall of said container as said container approaches its collapsed condition to open said valve initiating flow of liquid propellant from said tank;
(d) and means for expanding said container during flow of propellant from said tank thereby to refill said container with propellant for subsequent flow into said supply line after said supply line valve has been closed and reopened.

7. The combination with a rocket motor and liquid propellant tank interconnected by a valve controlled supply line and means for introducing a pressurizing gas into said tank, of a starting means interposed between said tank and said supply line, said starting means comprising:
(a) a tubular valve body interposed between said supply line and said tank;
(b) a collapsible container for liquid propellant capping an end of said valve body and extending into said tank for exposure to pressures therein, whereby on opening the valve in said supply line and pressurizing said tank, liquid propellant is discharged into said supply line as said container is collapsed;
(c) a valve armature movable between a first position closing communication between said tank and said supply line and a second position opening communication therebetween;
(d) and means operable as said container approaches its collapsed condition to move said valve armature from its first to its second position.

8. The combination with a rocket motor and liquid propellant tank interconnected by a valve controlled supply line and means for introducing a pressurizing gas into said tank, of a starting means interposed between said tank and said supply line, said starting means comprising:
(a) a tubular valve body interposed between said supply line and said tank, said valve body having side ports communicating with said tank;
(b) a tubular valve armature having a venturi throat longitudinally therethrough forming a passage between the ends of said valve body, said valve armature being movable within said valve body between a first position closing said side ports and a second position opening said side ports for flow of propellant from said tank through said venturi passage into said supply line;
(c) means yieldably holding said valve armature in its first position;
(d) a collapsible container for liquid propellant capping an end of said valve body and extending into said tank for exposure to pressures therein, whereby on opening the valve in said supply line and pressurizing said tank, liquid propellant is discharged through the venturi throat in said valve armature;
(e) and means interposed between said collapsible container and said valve armature for transmitting movement of said container to said valve armature thereby to shift said valve armature from its first to its second position as said container approaches its collapsed condition;
(f) said valve body and said valve armature defining therebetween a vacuum chamber communicating with said venturi throat to produce an unbalanced force on said valve armature in opposition to said yieldable means thereby to hold said valve armature in its second position during discharge of propellant from said tank.

9. A starting means for rocket motors as set forth in claim 8 wherein:
(a) said collapsible container tends to assume its extended position, whereby on equalization of pressures externally and internally thereof, said container refills with propellant.

(References on following page)

References Cited by the Examiner

UNITED STATES PATENTS

| | | |
|---|---|---|
| 2,496,711 | 2/1950 | Goddard. |
| 2,523,008 | 9/1950 | Goddard. |
| 3,098,353 | 7/1963 | Abild _____ 60—39.48 X |
| 3,234,728 | 2/1966 | Christian et al. ____ 60—39.48 X |

OTHER REFERENCES

Ring, E.: Rocket Propellant and Pressurization Systems, Prentiss-Hall, Inc., Englewood Cliffs, N.J., 1964, p. 140.

MARK NEWMAN, *Primary Examiner.*

D. HART, *Assistant Examiner.*